May 20, 1958   M. E. GREEN   2,835,310
DEVICE FOR HOLDING BRAKE LINING IN POSITION
TO BE BONDED TO A BRAKE SHOE
Filed Dec. 11, 1953
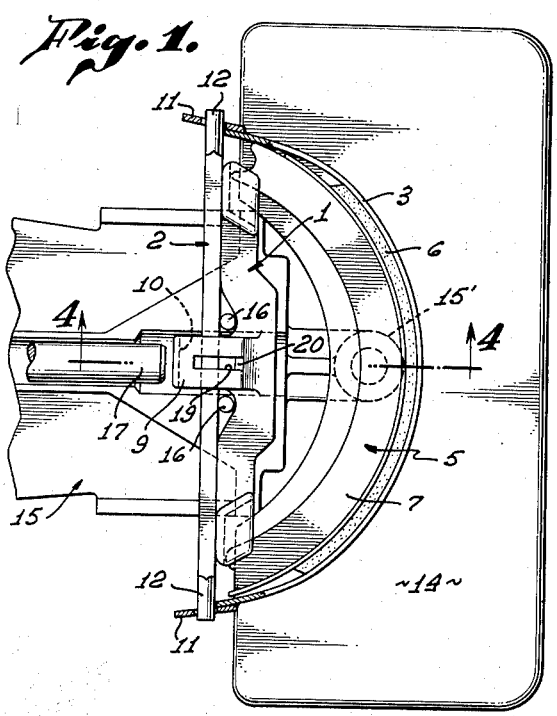
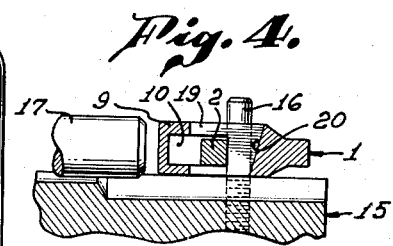
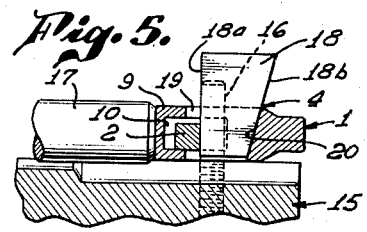
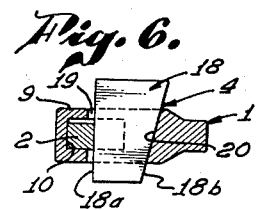
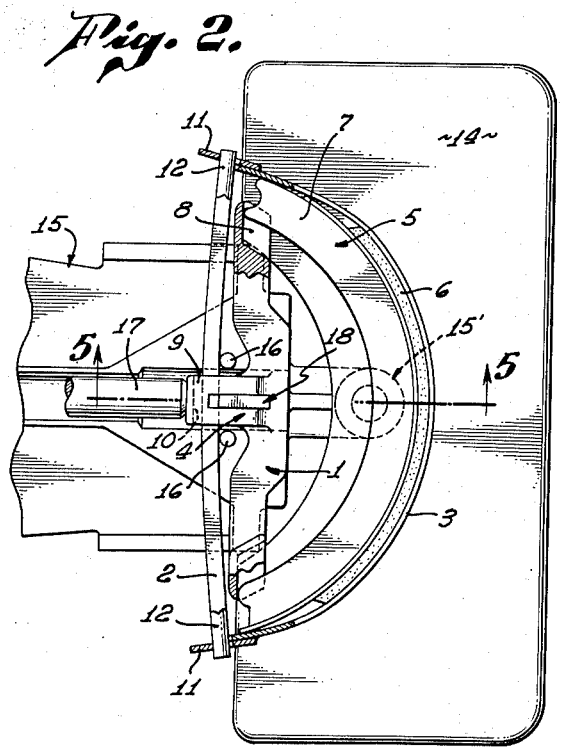
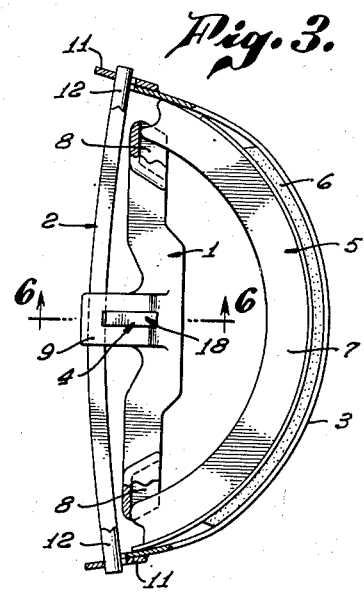
INVENTOR.
MARVIN E. GREEN,
BY
Paul A. Weilein
ATTORNEY

United States Patent Office 2,835,310
Patented May 20, 1958

2,835,310

DEVICE FOR HOLDING BRAKE LINING IN POSITION TO BE BONDED TO A BRAKE SHOE

Marvin E. Green, Los Angeles, Calif.

Application December 11, 1953, Serial No. 397,624

5 Claims. (Cl. 154—1)

This invention relates to clamps for holding brake lining and brake shoes properly assembled in the operation of bonding the lining to the shoes by means of a thermo-setting adhesive.

A clamp of this character as shown in my pending application, Serial No. 387,606 filed October 22, 1953, includes a rigid shoe-engaging body, a flexible lining-embracing band and a spring bar for tensioning the bands. This bar is connected between its ends with the body so that it is permitted limited bodily movement and may be flexed relative thereto. The clamping band after being positioned over the lining of the shoe is hooked at its ends onto the ends of the spring bar.

A power operated ram or press is employed in cooperation with stationary abutment means engaged with the spring bar, to flex the spring bar. After the flexure of the bar has been effected, a locking member is interposed between the body and the bar to releasably hold the bar in flexed position such that the band will exert a uniform pressure throughout the lining to hold the lining in intimate engagement with the shoe.

The spring bar is mounted in an apertured member on the body so as to have limited bodily movement toward and away from the body proper. An opening is provided in this eye or clevis so that the locking member, such as a pin, may be inserted to engage and hold the bar in flexed position. Due to the limited space afforded by the apertured member but one opening is provided therein to receive the locking pin and in consequence the locking pin will lock the spring bar in but one flexed position.

It is desired in the use of the clamp to vary the force of the spring, that is to vary the extent of flexure of the spring according to the thickness of the brake lining as in some instances lining of greater than standard thickness known as "oversize" lining is bonded to shoes instead of lining of standard size. Accordingly, where the spring bar is subject to being releasably held in but one flexed position, it is apparent that it is not possible to vary the flexure of the spring bar best to suit the particular shoe and "size" of the lining.

Accordingly, it is an object of this invention to provide an improved clamp of the character described which makes it possible to apply the desired clamping pressure alike for clamping standard and oversize lining to brake shoes.

It is another object of this invention to provide in a clamp such as described, a novel and highly efficient means for releasably locking the spring bar in variously flexed positions.

A further object of this invention is to provide an improved clamp such as described, wherein the locking means includes a simple form of wedge adapted to be positioned in a slot in contact with the spring bar for releasably holding the bar in the desired flexed position.

Another object of this invention is to provide a clamp such as described, wherein the wedge holding the spring bar in flexed position may readily be removed by being knocked out of place, thereby quickly releasing the bar so that the clamp may be removed from the brake shoe.

It is another object of this invention to provide a clamp such as described, wherein the wedge may be placed in such a position that upon flexing of the bar, the wedge will automatically move into position to lock the spring against movement out of the desired flexed position.

This invention possesses many other advantages and has other objects which may be made more easily apparent from a consideration of one embodiment of the invention. For this purpose there is shown one form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is a top plan view of a device embodying the present invention as it would appear when applied to a brake shoe before flexing the spring bar;

Fig. 2 is a top plan view, partly in section, of the device as it would appear when the bar has been flexed a predetermined extent and locked in flexed position;

Fig. 3 is a top plan view, partly in section of the device and shoe, as when removed from the apparatus for flexing the spring bar and in readiness for being placed in an oven to bond the lining to the shoe, the bar being shown as flexed the maximum extent.

Fig. 4 is a fragmentary sectional view on an enlarged scale, taken on the line 4—4 of Fig. 1.

Fig. 5 is a fragmentary sectional view on an enlarged scale, taken on the line 5—5 of Fig. 2; and Fig. 6 is a sectional view on an enlarged scale, taken on the line 6—6 of Fig. 3.

A clamp embodying the present invention includes a rigid body 1, a spring connected therewith in the form of a resilient bar 2, a flexible band 3, and locking means 4 for releasably holding the bar in variously flexed positions while the band is connected with the bar. These elements are constructed and arranged so that when the body 1 is positioned against a brake shoe 5, the band 3 after being placed over the brake lining 6 positioned with the thermo-setting adhesive coated side thereof against the shoe, may be detachably connected at its ends with the ends of the spring bar 2.

With the clamp applied in this manner (see Fig. 1) the spring bar 2 is subject to being flexed in a manner which will be hereinafter fully described, to tension the band 3 as desired for clamping the lining 6 upon the shoe under a uniform pressure best suited for the particular shoe and lining. The locking means 4 provides for releasably holding the spring bar in the particular position to which it may be flexed, thereby maintaining the desired pressure on the band 3.

The body 1 is in the form of a rigid bar adapted to span the concave side of the brake shoe 5 with the ends of the brake shoe rib 7 engaged in recesses 8 in the ends of the body.

The resilient bar 2 is adjustably supported by an outward projection 9 provided centrally of the ends of the body 1. This projection has an elongated aperture or slot 10 therein in which the bar 2 is mounted for limited bodily movement toward and away from the body 1 as well as for axial movement relative thereto. The bar 2, as shown, is non-circular in cross section and the aperture 10 is of such form and size that the bar may slide both bodily and axially therein but will be restrained from angular movement about its axis.

The ends of the flexible band 3 are apertured so that they may be hooked over the ends of the spring bar 2. As here shown, the apertures are formed by washers 11 welded to the ends of the band, the ends of the bar 2 being somewhat rounded, as at 12, for ready insertion into the washers.

The means here shown for flexing the spring bar 2 includes a table 14 and a base member 15 on which latter the table is vertically adjustably supported by means 15 as shown in my aforementioned application. A pair of stationary pressure applying members in the form of studs 16 are fixed to the base. A movable power operated pressure applying member in the form of a rod 17 is also operable on the base. This rod may be power operated in any suitable manner, as by means of a fluid pressure actuated ram or piston-cylinder unit, for example as shown in my copending application hereinbefore identified.

The body 1 and bar 2 are mounted on the base 15 so that the studs 16 are disposed between the bar and the body close to opposite sides of the projection 9. When the body 1 and bar 2 are thus positioned, the projection 9 is disposed in line with the power operated pressure applying member 17 as shown in Fig. 1.

After the band 3 has been applied over the lining 6 and hooked onto the ends of the bar 2 as shown in Fig. 1, the power operated member 17 is moved forwardly against the projection 9 as shown in Fig. 2, to move the body 1 and shoe forwardly while the bar is held against such forward movement by the lugs 16 thereby causing the bar 2 to be flexed. The extent of flexure may be varied as desired within the range of flexure of the bar and when the bar has been flexed as desired, the locking means 4 is employed to releasably hold the bar in the desired flexed position.

The means for flexing the bar as shown in my aforementioned pending application includes a pressure gauge. Thus, it is apparent that when this means is used with the present clamp the gauge provides for determining the flexing pressure to regulate the flexure of the bar 2 so that the desired clamping pressure of the band against the lining may be effected.

The locking means 4 includes a simple wedge shaped plate or wedge 18 having a side edge 18a and an opposite side edge 18b inclined relative to the edge 18a. A slot 19 for reception of the wedge 18 is provided in the member or projection 9 so as to intersect the aperture 10. The aperture 10 and the slot 19 have a common end wall 20 inclined in correspondence with the edge 18b of the wedge 18 and adapted to be engaged therewith while the edge 18a engages the resilient bar 2 as shown in Figs. 5 and 6.

When the bar 2 has been flexed as desired, the smaller end of the wedge 18 is inserted in the slot 19 to engage the edges 18a and 18b with the bar 2 and the wall 20 respectively, thereby releasably locking the bar 2 against movement out of flexed position. With this arrangement it will be seen that the bar may be locked in variously flexed positions to provide the desired clamping pressure for holding the lining on the shoe.

Where brake lining of greater than standard thickness is to be bonded to a brake shoe, for example, on a brake shoe for use with a brake drum worn out of true and which has been ground true, a clamping pressure other than that required for lining of standard thickness should be applied. Accordingly, the extent of flexure of the spring bar 2 should be varied best to suit the particular size of the brake lining. The locking means as here provided makes it possible to lock the bar in the desired position for effecting variational clamping pressures according to the size of the lining and any other factors in which differential clamping pressures may be desired.

The wedge 18 may be placed in the slot 19 before the bar 2 has been flexed the desired extent, whereby as the flexing continues, the wedge will gravitate to a position locking the bar in the position to which the bar is flexed.

After the clamp has been applied as shown in Fig. 2, and the bar 2 has been locked in flexed position, the shoe with the clamp thereon is removed from the table and base, and as a unit as shown in Fig. 3, may be placed in an oven or otherwise subjected to heat to bond the lining thereto.

I claim:

1. A device for holding brake lining in position to be bonded to the convex side of an arcuate brake shoe comprising: a base; an elongated body adapted to be supported on said base so as to span the concave side of the brake shoe; means on the ends of said body for engaging the ends of the brake shoe to hold the shoe and body against relative movement; a resilient bar of greater length than said body; mounting means intermediate the ends of said body connecting said bar and body for limited relative bodily movement; stationary members on said base disposed between said bar and said body on opposite sides of said mounting means for engaging said bar and causing flexure of said bar responsive to relative bodily movement between said bar and said body; a flexible band for holding the brake lining on the shoe; means on the ends of said band for detachably connecting said band with the ends of said bar; and means engageable with said mounting means and said bar for locking said bar in variously flexed positions.

2. A device for holding brake lining in position to be bonded to the convex side of an arcuate brake shoe comprising: a base; an elongated body adapted to be supported on said base so as to span the concave side of the brake shoe; means on the ends of said body for engaging the ends of the brake shoe to hold the shoe and body against relative movement; a resilient bar of greater length than said body; mounting means intermediate the ends of said body connecting said bar and body for limited relative bodily movement; stationary members on said base disposed between said bar and said body on opposite sides of said mounting means for engaging said bar and causing flexure of said bar responsive to relative bodily movement between said bar and said body; a flexible band for holding the brake lining on the shoe; means on the ends of said band for detachably connecting said band with the ends of said bar; and means gravitationally movable on said mounting means for locking said bar in flexed position responsive to flexure of said bar.

3. A device for holding brake lining in position to be bonded to the convex side of an arcuate brake shoe comprising: a base; an elongated body adapted to be supported on said base so as to span the concave side of the brake shoe; means on the ends of said body for engaging the ends of the brake shoe to hold the shoe and body against relative movement; a resilient bar of greater length than said body; mounting means intermediate the ends of said body connecting said bar and body for limited relative bodily movement; stationary members on said base disposed between said bar and said body on opposite sides of said mounting means for engaging said bar and causing flexure of said bar responsive to relative bodily movement between said bar and said body; a flexible band for holding the brake lining on the shoe; and means on the ends of said band for detachably connecting said band with the ends of said bar; said mounting means including a projection on said body having a slot in which said bar is movable relative to said body; said projection having a wedge-shaped slot intersecting the first mentioned slot; and a wedge insertable into said wedge-shaped slot for locking said bar in differently flexed positions.

4. A device for holding brake lining in position to be bonded to the convex side of an arcuate brake shoe comprising: a base; an elongated body adapted to be supported on said base so as to span the concave side of the brake shoe; means on the ends of said body for engaging the ends of the brake shoe to hold the shoe and body against relative movement; a resilient bar of greater length than said body; mounting means intermediate the ends of said body connecting said bar and body for limited relative bodily movement; a stationary member on said base for engaging said bar and causing flexure of said bar responsive to relative bodily movement between said bar and said body; a flexible band for holding the brake lining on the shoe; means on the ends of said band for detachably connecting said band with the ends of said bar; and means engageable with said mounting means and said bar for locking said bar in variously flexed positions.

5. A device for holding brake lining in position to be bonded to the convex side of an arcuate brake shoe comprising: a base; an elongated body adapted to be supported on said base so as to span the concave side of the brake shoe; means on the ends of said body for engaging the ends of the brake shoe to hold the shoe and body against relative movement; a resilient bar of greater length than said body; mounting means intermediate the ends of said body connecting said bar and body for limited relative bodily movement; stationary members on said base disposed between said bar and said body on opposite sides of said mounting means for engaging said bar and causing flexure of said bar responsive to relative bodily movement between said bar and said body; a flexible band for holding the brake lining on the shoe; and means on the ends of said band for detachably connecting said band with the ends of said bar; said mounting means including a projection on said body having a slot in which said bar is movable relative to said body; said projection having a wedge-shaped slot intersecting said first mentioned slot; and a wedge positioned in said last named slot so as to gravitate into position engaging and locking said bar, responsive to flexure of said bar.

References Cited in the file of this patent

UNITED STATES PATENTS

| | | |
|---|---|---|
| 261,610 | Howe | July 25, 1882 |
| 1,475,487 | Hammond | Nov. 27, 1923 |
| 1,846,157 | Stevens | Feb. 23, 1932 |
| 1,926,022 | Barrett | Sept. 12, 1933 |
| 2,009,046 | Fons | July 23, 1935 |
| 2,455,341 | Saunders | Nov. 30, 1948 |
| 2,589,036 | Bender | Mar. 11, 1952 |